United States Patent
Jennings

[11] Patent Number: 6,152,229
[45] Date of Patent: Nov. 28, 2000

[54] SUBSEA DUAL IN-LINE BALL VALVES

[75] Inventor: Charles E. Jennings, Houston, Tex.

[73] Assignee: ABB Vetco Gray Inc., Houston, Tex.

[21] Appl. No.: 09/138,687

[22] Filed: Aug. 24, 1998

[51] Int. Cl.[7] .............................. E21B 34/10; E21B 34/14
[52] U.S. Cl. ....................... 166/321; 137/613; 166/332.3; 251/58
[58] Field of Search ..................... 166/319, 321, 166/332.3, 363, 364; 137/613; 251/58

[56] References Cited

U.S. PATENT DOCUMENTS

| | | | |
|---|---|---|---|
| 3,568,715 | 3/1971 | Taylor, Jr. ........................... | 166/321 X |
| 4,076,077 | 2/1978 | Nix et al. ............................ | 166/321 X |
| 4,160,478 | 7/1979 | Calhoun et al. ..................... | 166/55.1 |
| 4,197,879 | 4/1980 | Young ................................. | 137/629 |
| 4,230,185 | 10/1980 | Fredd ................................. | 166/332.2 |
| 4,289,165 | 9/1981 | Fredd ................................. | 166/332.3 |
| 4,306,623 | 12/1981 | Brooks ............................... | 166/322 |
| 4,576,234 | 3/1986 | Upchurch ........................... | 166/319 |
| 4,651,828 | 3/1987 | Doremus ............................ | 166/319 |
| 4,691,777 | 9/1987 | Williamson, Jr. .................. | 166/319 |
| 4,766,960 | 8/1988 | Williamson, Jr. .................. | 166/321 |
| 4,903,775 | 2/1990 | Manke ................................ | 166/319 X |
| 5,284,209 | 2/1994 | Goodfrey ........................... | 166/380 |
| 5,551,665 | 9/1996 | Noack et al. ...................... | 166/324 X |

FOREIGN PATENT DOCUMENTS

| | | |
|---|---|---|
| 2170245 | 7/1986 | United Kingdom . |
| WO 96/35857 | 11/1996 | WIPO . |

*Primary Examiner*—George Suchfield
*Attorney, Agent, or Firm*—Felsman, Bradley, Vaden, Gunter & Dillon, L.L.P.; James E. Bradley

[57] ABSTRACT

A dual in-line ball valve assembly for a subsea tree intervention tool has a pair of axially-movable pistons and a rotatable linkage member pinned between each of the pistons and the independently operable ball valves. The linkage members have eccentric hubs which rotate the ball valves between open and closed positions when the pistons are axially actuated. A recess is formed in each ball valve adjacent to the central flow passage of the assembly for accommodating a lower side of tubing or wireline. The recesses prevent shearing of the tubing or wireline in two places when one of the valves moves to the closed position.

21 Claims, 5 Drawing Sheets

SUBSEA DUAL IN-LINE BALL VALVES

TECHNICAL FIELD

This invention relates in general to subsea tool design and in particular to a dual in-line ball valve assembly for a subsea tree intervention tool.

BACKGROUND ART

The use of in-line ball valve assemblies in subsea tree intervention tools is fairly well known in the art. The ball valves are used to open and close a central flow passage in the assembly and are typically hydraulically actuated. In some cases, the ball valves are designed to shear coiled tubing or wireline in the event of an emergency.

In one type of prior art device, U.S. Pat. No. 5,551,665, a pair of control pins slide radially inward within slots to actuate the ball between the open and closed positions. Similarly, PCT Publication No. WO 96/35857 shows control pins which slide axially to accomplish the same objective. Regarding the shearing function, U.S. Pat. No. 4,160,478 shows a quadrant of a ball valve tool having a cutting mechanism which will cut coiled tubing in only one place. This is advantageous since a small loose segment of tubing would otherwise be cut. The segment could then fall into the bottom of the well and create problems. Another prior art device, U.S. Pat. No. 5,284,209, has a ball valve that shears coiled tubing in only one place due to a recess in the housing.

Disclosure of the Invention

A dual in-line ball valve assembly for a subsea tree intervention tool has a pair of axially-movable pistons and a rotatable linkage member pinned between each of the pistons and the independently operable ball valves. The linkage members have eccentric hubs which rotate the ball valves between open and closed positions when the pistons are axially actuated. A recess is formed in each ball adjacent to the central flow passage of the assembly for accommodating a lower side of tubing or wireline. The recesses prevent shearing of the tubing or wireline in two places when one of the valves moves to the closed position.

BEST MODE FOR CARRYING OUT THE INVENTION

Figure 1:
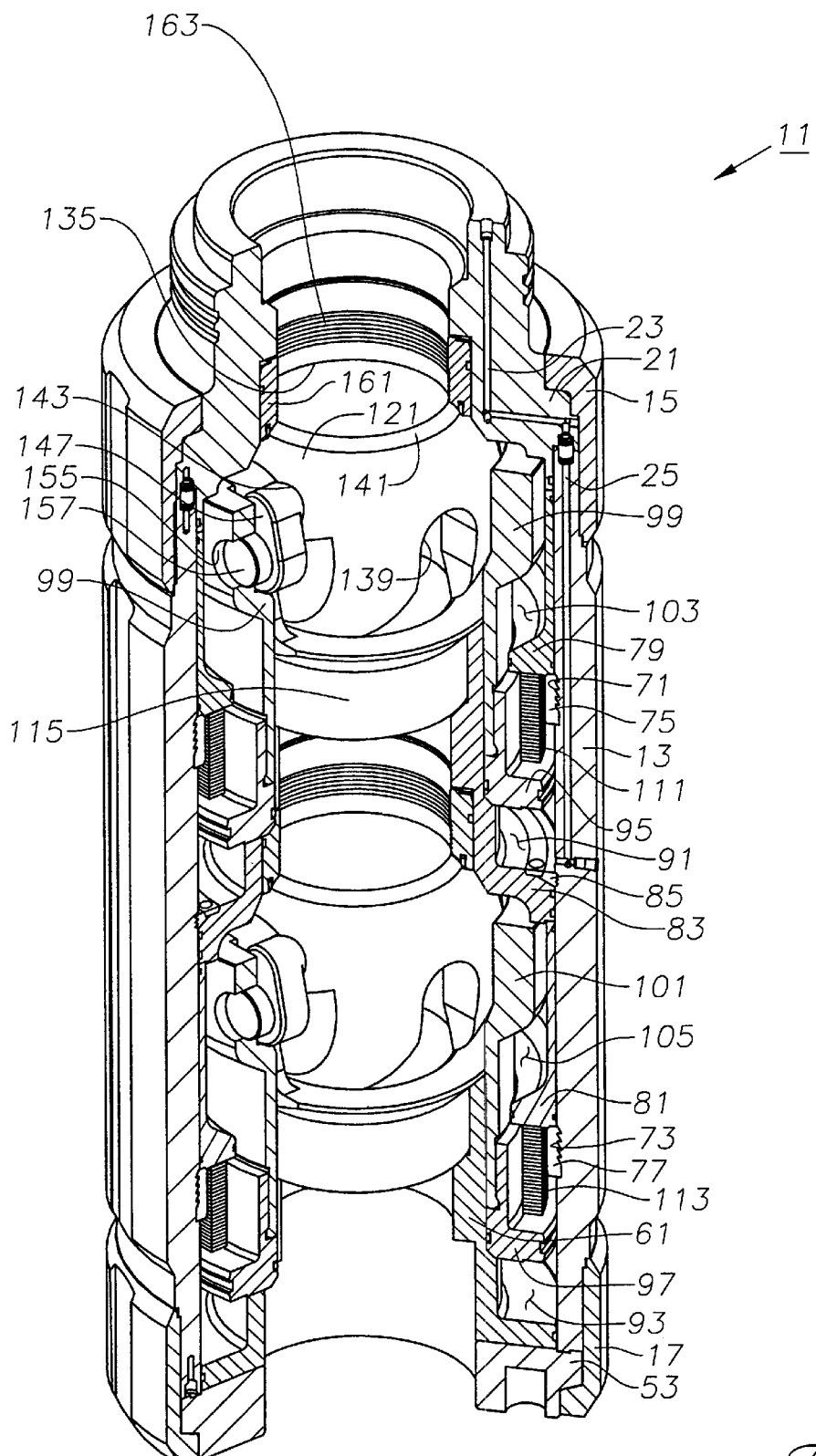
FIG. 1 is a partially sectioned isometric view of a dual ball valve assembly constructed in accordance with the invention.

Referring to FIG. 1, a dual ball valve assembly 11 for a subsea tree intervention tool is shown. Assembly 11 has an outer tubular housing 13 with an upper sub 15 and a lower sub 17 secured to its upper and lower ends, respectively. A generally cylindrical upper ball support housing 21 is mounted to the upper end of housing 13 and upper sub 15. Upper ball support housing 21 has a fluid passage 23 which communicates with a fluid passage 25 in housing 13. As will be described below, a valve (not shown) controls the flow of fluid to various portions of assembly 11. A base member 53 is mounted between housing 13 and bottom sub 17. The upper surface of base member 53 seats against the upper lower surface of a ball support housing 61.

Housing 13 has a pair of internal groove profiles 71, 73 which are axially spaced apart from one another. Locking C-rings 75, 77 are threaded into groove profiles 71, 73, respectively, to provide upper and lower landing shoulders. Tubular support members 79, 81 are landed and sealed on top of C-rings 75, 77, respectively. The upper end of support member 79 vertically supports upper ball support housing 21. The upper end of support member 81 vertically supports a middle ball support housing 83. A third locking C-ring 85 is used to secure middle ball support housing 83 from movement relative to housing 13.

Figure 3:
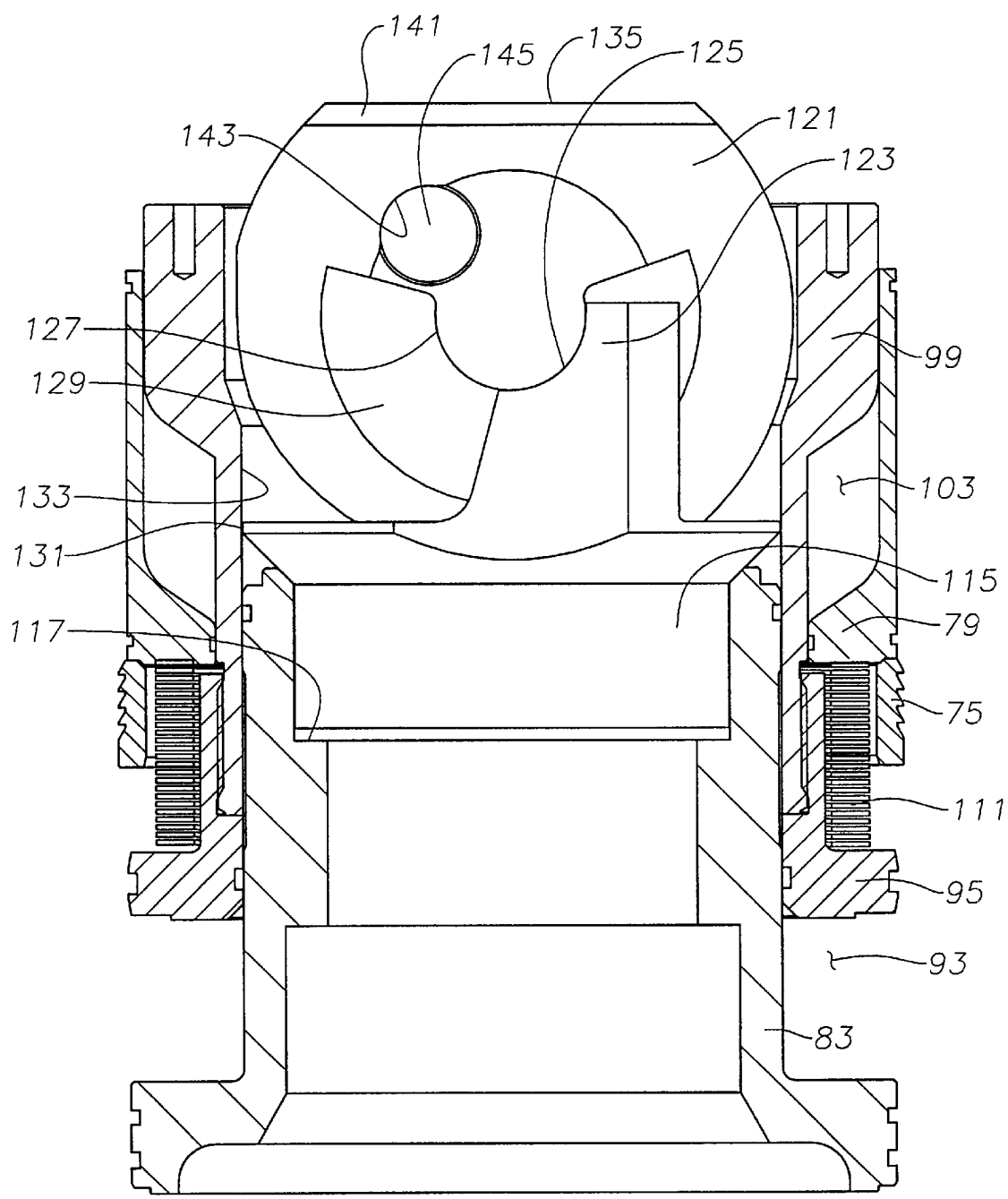
FIG. 3 is a partial sectional side view of one of the ball valves of the assembly of FIG. 1.

As shown in FIGS. 1 and 3, vertical tubular chambers 91, 93 are defined between the lower ends of support members 79, 81, ball support housings 83, 61 and housing 13, respectively. Chambers 91, 93 contain sealed pistons 95, 97 which are mounted to the lower ends of piston extensions 99, 101, respectively. Piston extensions 99, 101 are elongated members which extend above support members 79, 81 into upper chambers 103, 105. Chambers 103, 105 are located above and radially inward of support members 79, 81, and below ball support housings 21, 83, respectively. Vertical compression wave springs 111, 113 are located between the lower ends of support members 79, 81 and an upper surface of pistons 95, 97. Springs 111, 113 bias pistons 95, 97 downward away from support member 79, 81. Pistons 95,97 along with their extensions 99, 101 serve as linearly movable actuator members.

Assembly 11 contains two ball valve assemblies which are identical. The only difference between them is the components of assembly 11 that they interact with. Thus, for simplicity, only the upper ball valve assembly will be described in detail.

Figure 2:
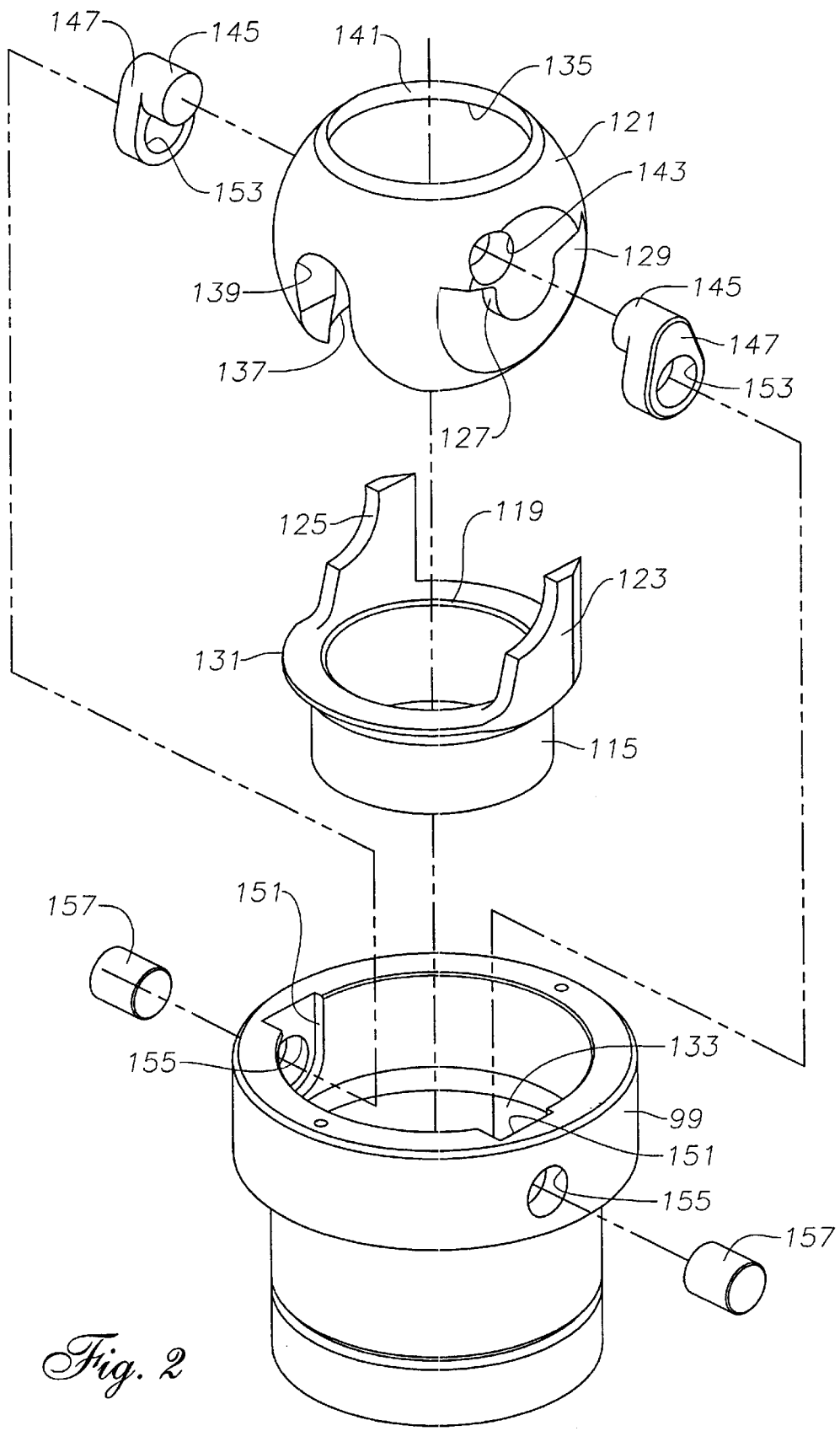
FIG. 2 is an exploded isometric view of one of the ball valves of the assembly of FIG. 1.

Referring to FIGS. 2 and 3, ball support housing 83 contains an internal shoulder 117 upon which a valve carrier 115 is landed. Valve carrier 115 has an internal valve seat 119 which contacts the outer surface of a spherical hollow ball 121. Valve carrier 115 has a pair of symmetrical, upward-protruding, thin-walled arms 123 located on opposite sides. Each arm 123 has an arcuate concave yoke or shelf 125 for receiving a concave, semicircular hub 127 on each side of ball 121. A semi-circular recess 129 surrounds each hub 127 to allow ball 121 to rotate 90 degrees relative to valve carrier 115. Valve carrier 115 has a rim 131 with an outer diameter which is approximately equal to the diameter of a bore 133 in piston extension 99 (FIG. 3).

Ball 121 has a circular openings 135, 137 on its upper and lower ends. A U-shaped recess 139 extends from lower opening 137 approximately 90 degrees through the body of ball 121. Ball has a hardened circular insert 141 mounted in upper opening 135. In the preferred embodiment, insert 141 is formed from Stellite and welded or brazed onto ball 121. Ball 121 also has a pair of symmetrical circular holes 143 formed above and to one side of hubs 127. Holes 143 are eccentric to a stationary rotational axis of ball 121 extending through the centers of hubs 127. Each hole 143 is provided for rotatably receiving the pin 145 of a trunion 147. Each trunion 147 is rigidly mounted in a close-fitting profile 151 on the inner surface and upper end of piston extension 99. Trunions 147 and piston extension 99 have holes 153, 155, respectively, for receiving rotational pins 157. Alternately, pins 157 could be integrally formed with trunions 147. In that case, piston extension 99 would be in two halves to enable pins 157 to locate in holes 155.

Referring back to FIG. 1, each ball valve assembly also has an upper annular valve seat 161. Valve seats 161 are mounted in a recess on the inner surface of ball support housings 21, 83. Valve seat 161 has a tapered lower edge which remains in contact with the outer surface of ball 121. The inner surface of valve seat 161 contains gripping teeth 163 which protrude radially inward.

Figure 5:
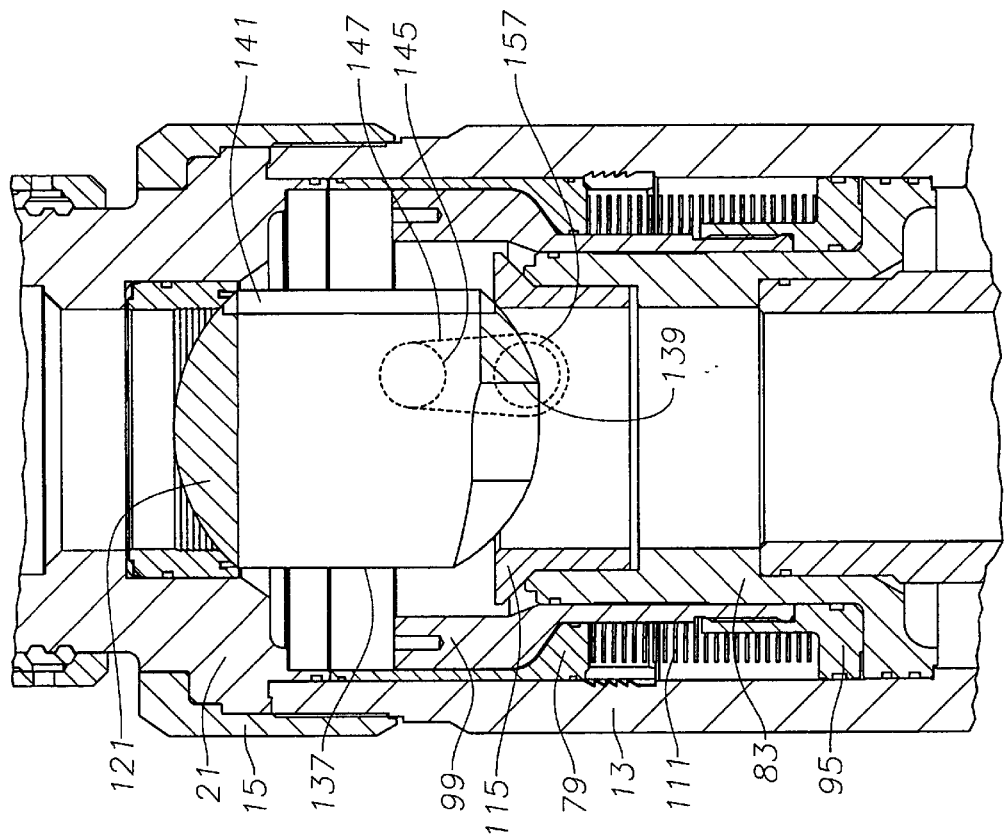
FIG. 5 is a sectional side view of the assembly of FIG. 1 showing one of the ball valves in a closed position.

In operation (FIGS. 4 and 5), assembly 11 is installed in a subsea tree intervention tool (not shown). At installation, balls 121 are closed (FIG. 5), such that their upper and lower openings 135, 137 are 90 degrees out of alignment with the bore of assembly 11 to prevent fluid flow therethrough. In this position, springs 111, 113 are expanded and pistons 95, 97 are at the bottom of chambers 91, 93, while piston extensions 99, 101 are at the bottom of chambers 103, 105.

Balls 121 may be opened so that their upper and lower openings 135, 137 vertically align with the bore of assembly 11 to permit fluid flow therethrough and the passage of tools. Balls 121 are independently operable between their open and closed positions, and each is actuated in the same manner.

Figure 4:
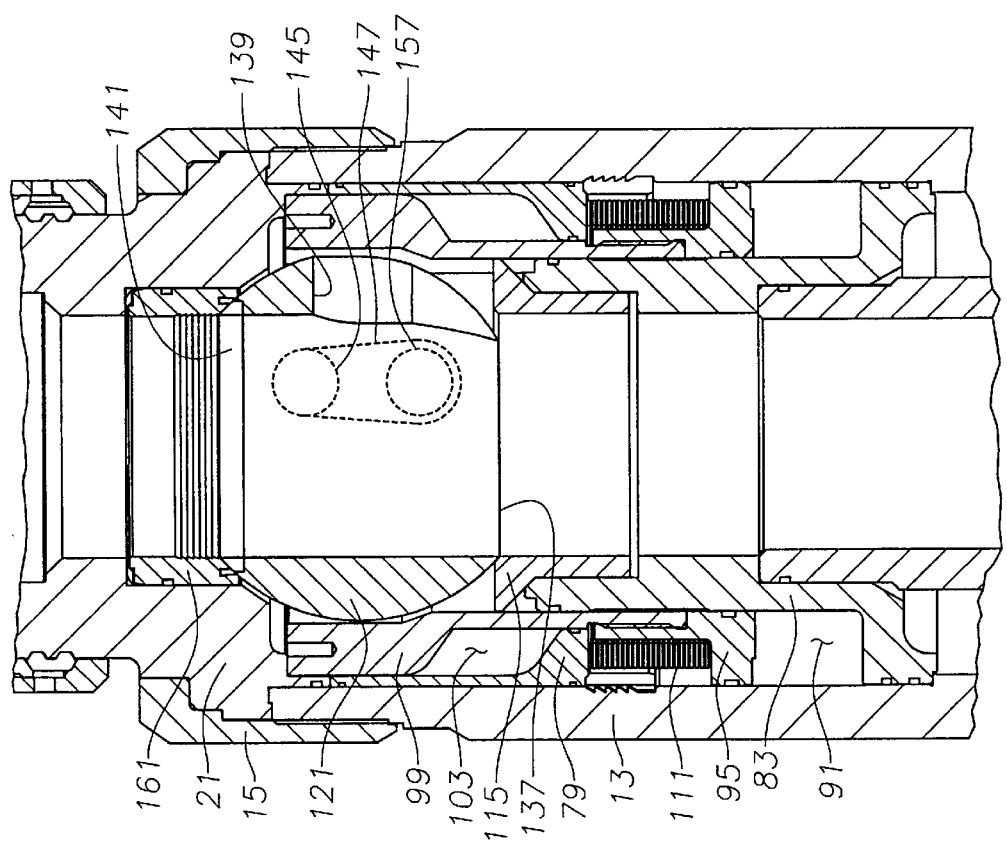
FIG. 4 is a sectional side view of the assembly of FIG. 1 showing one of the ball valves in an open position.

For example, to close the upper ball assembly, hydraulic fluid is pumped through passages 23, 25 and between piston 95 and ball support housing 83. As chamber 91 begins to fill with hydraulic fluid, piston 95 and, thus, piston extension 99 are forced upward, thereby collapsing spring 111 (FIG. 4). Trunions 147 are forced to move vertically with piston extension 99 since they are constrained from movement relative to piston extension 99 in recesses 151. As trunions 147 move upward, pins 145, 157 rotate in holes 143, 153, respectively (FIGS. 2 and 3). Valve seats 119, 161 prevent ball 121 from moving longitudinally but allow it to rotate. The eccentric location of holes 143 relative to the stationary rotational axis of ball 121 causes torque to be applied to ball 121 as piston extension 99 and trunions 147 rise. The torque rotates ball 121 clockwise by 90 degrees. The upward movement of piston 95 and the rotation of ball 121 cease when the upper end of piston extension 99 abuts ball support housing 21. Ball 121 is spring-biased by spring 111 to the closed position (FIG. 5) in case hydraulic pressure is removed.

Figure 7:
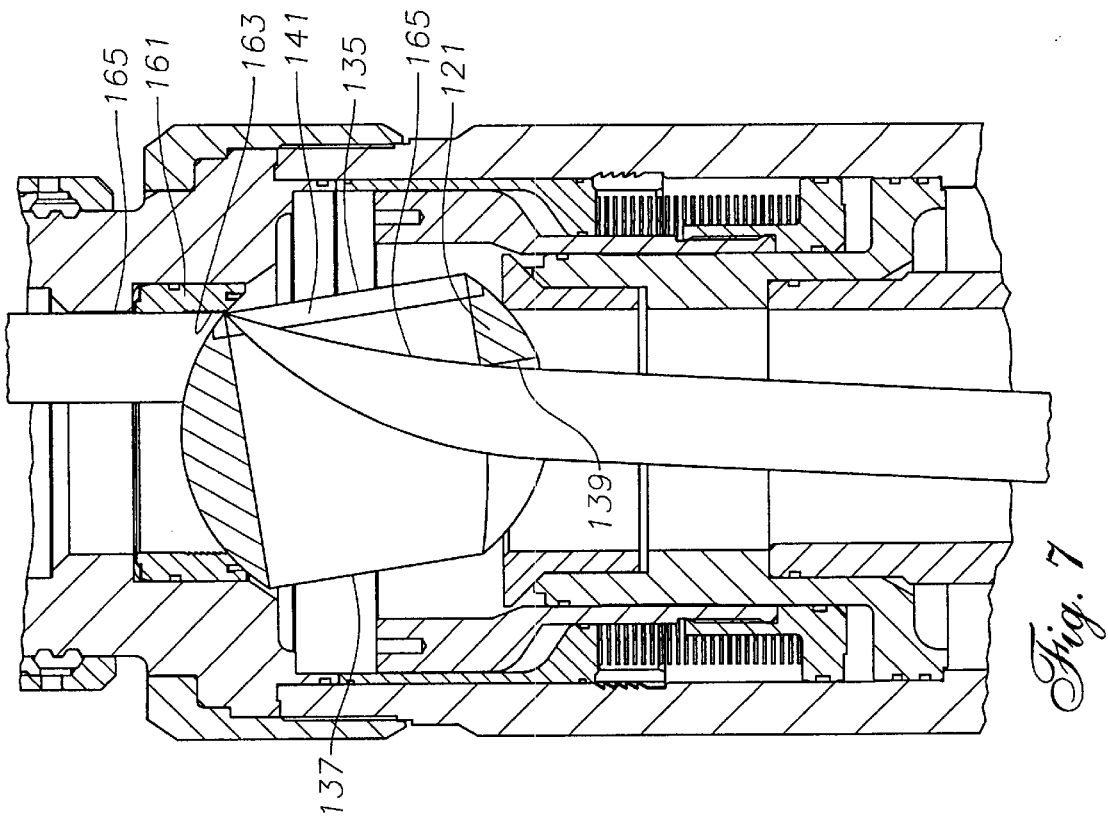
FIG. 7 is a sectional side view of the assembly of FIG. 1 showing tubing extending through the assembly after one of the ball valves has been closed.
Figure 6:
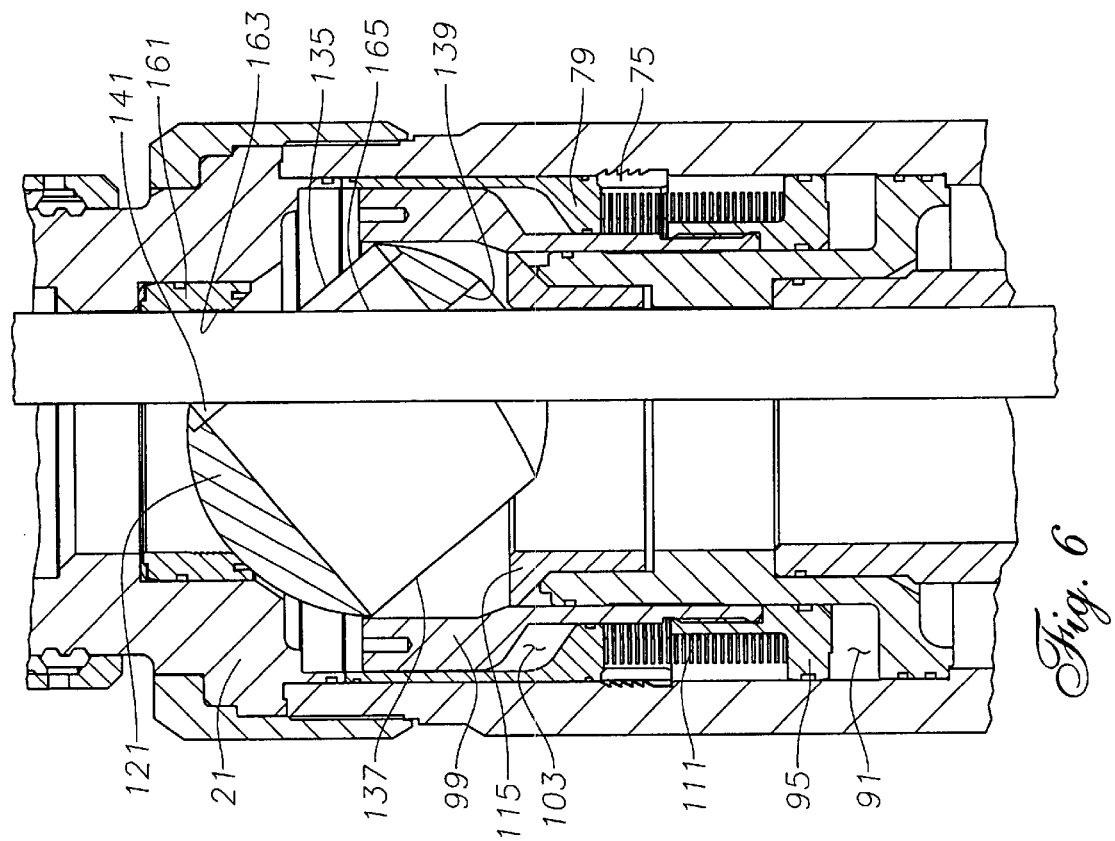
FIG. 6 is a sectional side view of the assembly of FIG. 1 showing tubing extending through the assembly just prior to one of the ball valves being closed.

Referring now to FIGS. 6 and 7, assembly 11 is designed to shear wireline or coiled tubing 165 extending through its bore in the event of an emergency. As ball 121 moves to the closed position, insert 141 in opening 135 contacts the side of tubing 165 and presses it against upper valve seat 161. The gripping teeth 163 on the inner surface of valve seat 161 prevent tubing 165 from slipping relative to ball 121. As ball 121 continues to close, the sharp hardened edge of insert 141 pierces through tubing 165, severing it into two pieces. Since the recess 139 extends continuously from bottom opening 137, the lower portion of tubing 165 is accommodated by recess 139 and is not cut.

The invention has significant advantages. The linkage members utilize eccentric hubs instead of slots to rotate the ball valves between open and closed positions when the pistons are axially actuated. This configuration reduces the amount of movement required to actuate the assembly. The recess built into each ball valve prevents tubing from being sheared in two places when the valve is closed.

While the invention has been shown or described in only some of its forms, it should be apparent to those skilled in the art that it is not so limited, but is susceptible to various changes without departing from the scope of the invention.

I claim:

1. A valve assembly, comprising:
   an outer housing with a longitudinal axis;
   a ball mounted in the housing and having a central bore and a rotational axis which is perpendicular to the central bore;
   a valve seat in the housing for sealing against the ball;
   an axially-movable piston carried in the housing for rotating the ball between open and closed positions; and
   a linkage member pivotally mounted between the piston and the ball, the linkage member eccentrically engaging the ball relative to the rotational axis such that torque is applied to the ball when the piston is moved along the longitudinal axis, thus moving the ball between the open and closed positions.

2. The valve assembly of claim 1, further comprising a recess formed in the ball extending continuously from the central bore of the ball for accommodating a lower side of tubing extending through the valve assembly to prevent shearing of the tubing in two places when the ball is moved to the closed position.

3. The valve assembly of claim 1 wherein the linkage member comprises a trunion having a first pin rotatably mounted in a hole provided in the ball, the hole being offset from the rotational axis, and a second pin rotatably mounted in a hole in a sidewall of the piston.

4. The valve assembly of claim 1 wherein the linkage member comprises a trunion located on each side of the ball, each trunion having a first pin rotatably mounted in a hole provided in one side of the ball, the holes being offset from the rotational axis, and a second pin rotatably mounted in a hole in one sidewall of the piston.

5. The valve assembly of claim 1 wherein the ball has a pair of hubs on opposite sides located on the rotational axis; and wherein the valve assembly further comprises:
   a valve carrier stationarily mounted in the housing, and a yoke for. pivotally receiving the hubs on the ball.

6. The valve assembly of claim 1, further comprising a hardened insert mounted in an opening to the central bore of the ball.

7. The valve assembly of claim 1, further comprising a spring mounted between the outer housing and the piston for biasing the ball to the closed position.

8. A valve assembly, comprising:
   an outer housing;
   a ball mounted in the housing and having a central bore, a rotational axis which is perpendicular to the central bore, and a pair of hubs on opposite sides located on the rotational axis;
   a yoke for pivotally receiving the hubs on the ball;
   a valve carrier stationarily mounted in the housing, the yoke being stationarily carried by the valve carrier;
   a valve seat in the housing for sealing against the ball;
   a linearly movable actuator member carried in the housing for rotating the ball between open and closed positions;
   a spring mounted between the outer housing and the actuator member for biasing the ball to the closed position; and a trunion having a first end rotatably mounted to, the ball at a point that is offset from the rotational axis, and a second end rotatably mounted to the actuator member, such that the trunion eccentrically engages the ball relative to the rotational axis resulting in torque being applied to the ball when the actuator member is moved linearly relative to the housing, thus moving the ball between the open and closed positions.

9. The valve assembly of claim 8, further comprising a recess formed in the ball extending continuously from the central bore of the ball for accommodating a lower side of tubing extending through the valve assembly to prevent shearing of the tubing in two places when the ball is moved to the closed position.

10. The valve assembly of claim 8 wherein the trunion comprises a pair of trunions, one of which is located on each side of the ball.

11. The valve assembly of claim 8, further comprising a hardened insert mounted in an opening to the central bore of the ball.

12. A valve assembly for a subsea tree intervention tool, comprising:

an outer housing having a longitudinal axis;

a pair of axially spaced-apart ball valves mounted in the housing, each of the ball valves having a ball with a central bore and a rotational axis which is perpendicular to the central bore a pair of valve seats mounted in the outer housing, each of which seals against one of the balls;

an axially-movable piston mounted adjacent to each of the balls for independently moving the balls between open and closed positions; and a linkage member pivotally mounted between and to each of the pistons and it respective ball, the linkage members eccentrically engaging the balls such that torque is applied to the balls when the pistons are moved along the longitudinal axis, thus moving the balls between their open and closed positions.

13. The valve assembly of claim 12, further comprising a recess formed in each of the balls extending continuously from the central bores of the balls for accommodating a lower side of tubing extending through the valve assembly to prevent shearing of the tubing in two places when one of the balls is moved to the closed position.

14. The valve assembly of claim 12 wherein each of the linkage members comprises a trunion having a first pin rotatably mounted in a hole provided in the ball, the hole being offset from the rotational axis, and a second pin rotatably mounted in a hole in a sidewall of the piston.

15. The valve assembly of claim 12 wherein each of the linkage members comprises a trunion located on each side of the ball, each trunion having a first pin rotatably mounted in a hole provided in one side of the ball, the holes being offset from the rotational axis, and a second pin rotatably mounted in a hole in one sidewall of the piston.

16. The valve assembly of claim 12 wherein each of the balls has a pair of hubs on opposite sides located on the rotational axis; and wherein the valve assembly further comprises:

a valve carrier stationarily mounted in the housing for each of the balls, and a yoke for pivotally receiving the hubs on each of the balls.

17. The valve assembly of claim 12, further comprising a hardened insert mounted in an opening to the central bore of each of the balls.

18. The valve assembly of claim 12, further comprising a spring mounted between the outer housing and each of the pistons for independently biasing the balls to the closed position.

19. The valve assembly of claim 12 wherein the balls are independently operable between their open and closed positions and each is actuated in the same manner.

20. A valve assembly, comprising:

an outer housing;

a ball mounted in the housing and having a central bore and a rotational axis which is perpendicular to the central bore;

a valve seat in the housing for sealing against the ball;

a linearly-movable actuator member carried in the housing for rotating the ball between open and closed positions; and a linkage member mounted between the actuator member and the ball, the linkage member rotatably engaging the ball at a point offset from the rotational axis such that torque is applied to the ball when the actuator member is moved linearly, thus moving the ball between the open and closed positions.

21. The valve assembly according to claim 8, wherein the actuator member comprises a piston.

* * * * *